United States Patent
Jecker et al.

(10) Patent No.: US 12,444,298 B2
(45) Date of Patent: Oct. 14, 2025

(54) PORTABLE PARKING ASSISTANCE SYSTEM, METHOD AND COMPUTER PROGRAM PRODUCT

(71) Applicant: VALEO SCHALTER UND SENSOREN GMBH, Bietigheim-Bissingen (DE)

(72) Inventors: Nicolas Jecker, Bietigheim-Bissingen (DE); Lasse Schnepel, Bietigheim-Bissingen (DE); Fabian Fuchs, Bietigheim-Bissingen (DE); Malte Joos, Bietigheim-Bissingen (DE); Ludovic Mosnier-Thoumas, Bietigheim-Bissingen (DE); Thirumalai Kumarasamy Ayyappan, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 136 days.

(21) Appl. No.: 18/566,908

(22) PCT Filed: May 25, 2022

(86) PCT No.: PCT/EP2022/064279
§ 371 (c)(1),
(2) Date: Dec. 4, 2023

(87) PCT Pub. No.: WO2022/258387
PCT Pub. Date: Dec. 15, 2022

(65) Prior Publication Data
US 2024/0274003 A1  Aug. 15, 2024

(30) Foreign Application Priority Data
Jun. 8, 2021 (DE) .................. 10 2021 114 629.1

(51) Int. Cl.
*G08G 1/00* (2006.01)
*G08G 1/04* (2006.01)
*B60W 30/06* (2006.01)

(52) U.S. Cl.
CPC ............... *G08G 1/04* (2013.01); *B60W 30/06* (2013.01)

(58) Field of Classification Search
CPC ........... G08G 1/04; G08G 1/00; B60W 30/06; B60W 60/0025; B60W 2556/40;
(Continued)

(56) References Cited

U.S. PATENT DOCUMENTS

| | | | |
|---|---|---|---|
| 9,581,997 B1 | 2/2017 | Penilla et al. | |
| 2018/0012497 A1* | 1/2018 | Penilla | ................... G05D 1/021 |
| 2020/0209877 A1* | 7/2020 | Yoon | ..................... G05D 1/0285 |

FOREIGN PATENT DOCUMENTS

| | | |
|---|---|---|
| CN | 111439255 A | 7/2020 |
| DE | 102014217847 A1 | 3/2016 |

(Continued)

OTHER PUBLICATIONS

Office Action issued counterpart Korean Patent Application No. 10-2024-7000658 mailed Feb. 12, 2025 (12 pages).
(Continued)

*Primary Examiner* — Shardul D Patel
(74) *Attorney, Agent, or Firm* — Osha Bergman Watanabe & Burton LLP (57) ABSTRACT

A portable parking assistance system is disclosed. The system is suitable for being set up and dismantled at different locations and is designed, when set up at a particular location, to control one or more vehicles within a predetermined region of the particular location. The system includes one or more sensors which are arranged in the predetermined ration. Each of the sensors is designed to detect
(Continued)

vehicles located in a respective specific detection range of the predetermined region and to wirelessly transmit a corresponding sensor signal. The parking assistance system also includes a control device which is designed to receive the sensor signals from the sensors, to determine a respective position of the vehicles on the basis of the received sensor signals, and control each vehicle on the basis of the determined positions of the vehicles and a specified digital map of the predetermined region.

12 Claims, 4 Drawing Sheets

(58) Field of Classification Search
CPC .................. B60W 2556/45; B62D 15/0285; H04W 4/44; B60Y 2300/06
USPC ........................................................ 701/117
See application file for complete search history.

(56) References Cited

FOREIGN PATENT DOCUMENTS

| | | |
|---|---|---|
| DE | 102015201204 A1 | 7/2016 |
| DE | 102015201209 A1 | 7/2016 |
| DE | 102019212842 A1 | 3/2021 |
| JP | 2020-108999 A | 7/2020 |
| KR | 10-2020-0144616 A | 12/2020 |

OTHER PUBLICATIONS

International Search Report and Written Opinion in corresponding International Application No. PCT/EP2022/064279, dated Sep. 16, 2022 (11 pages).

German Search Report in corresponding German Application No. 10 2021 114 629.1, dated Feb. 8, 2022 (7 pages).

* cited by examiner

PORTABLE PARKING ASSISTANCE SYSTEM, METHOD AND COMPUTER PROGRAM PRODUCT

The present invention relates to a portable parking assistance system and a method and a computer program product.

Vehicles that have an automated parking function are known, which are suitable in particular for automatic parking of the vehicle in a suitable parking garage or a suitable parking space. Such systems are referred to, for example, as automated valet parking systems. A distinction is made between two types of these. In a first type, the vehicle controls itself, with the parking garage, for example, having suitable features for orienting the vehicle, such as ARUCO codes. In a second type, the vehicle can be controlled remotely, wherein the parking garage, for example, has sensors and route planning means to control the vehicle. Between these two types, there may be different intermediate stages in which the functions are distributed differently between the vehicle and the parking garage.

In Type 2 valet parking systems, the sensors and logic are located in particular in the infrastructure, such as a parking garage, and are thus stationary. Deploying such a system at a specific location has up to now required a very time-consuming installation and commissioning process. From an economic point of view, this is only worthwhile if there is a long-term demand for the system. Therefore, the known systems are not suitable to be used for a temporary high demand, such as at a major event. In addition, conventional systems require an existing infrastructure in which they can be integrated. These are therefore also not suitable for use in locations that lack such an infrastructure.

Against this background, an object of the present invention is to provide a parking assistance system that overcomes the above-mentioned disadvantages of conventional parking assistance systems.

According to a first aspect, a portable parking assistance system is proposed, which is suitable for being set up and dismantled at a plurality of different locations and which is designed, when set up at a particular location, to control a number of vehicles within a predetermined region of the particular location. The portable parking assistance system comprises a number of sensors which can be arranged in the predetermined region, wherein each of the sensors is designed to detect vehicles located in a respective specific detection range of the predetermined region and to wirelessly transmit a corresponding sensor signal, and it comprises a control device which is designed to receive the sensor signals from the sensors, to determine a respective position of the vehicles on the basis of the received sensor signals, and control each vehicle on the basis of the determined positions of the vehicles and a specified digital map of the predetermined region.

This parking assistance system has the advantage that it can be used flexibly at different locations. The parking assistance system can thus be deployed for single events, such as trade fairs, concerts, sports events and the like. In addition, the parking assistance system can be deployed at locations that do not have infrastructure into which the parking assistance system could be integrated. These include, for example, open-air parking spaces, company or business premises, temporary storage and/or parking areas outside buildings and the like. Due to the wireless transmission of the sensor signals, time-consuming wiring of the sensors with the control device is not necessary, which makes the parking assistance system very flexible. In particular, the parking assistance system is also flexibly extendable to include additional sensors, for example to subsequently enlarge or otherwise adapt the predetermined region, and/or to enable a more accurate detection of the vehicles in regions identified as problematic.

The portable parking assistance system, when set up, forms in particular a Type 2 valet parking assistance system. It differs from conventional Type 2 valet parking assistance systems in particular in that it is intended to be set up and dismantled at different locations instead of being permanently installed in one specific location. When dismantled, the parking assistance system is in particular disassembled into a number of individual parts or components. When dismantled, the parking assistance system can be transported to the desired location, in particular by conventional means, such as by truck, train, ship and/or aircraft.

The predetermined region is defined, for example, by the provider or operator of the parking assistance system. This is carried out, for example, in a planning phase that precedes the setting up of the parking assistance system. In the planning phase, on the one hand, the predetermined region is defined, but an approximate arrangement of the sensors in the predetermined region is also defined, along with their respective desired detection ranges and a desired subdivision of the predetermined region into driving corridors and parking areas. However, the above features, which are determined during the planning phase, are not necessarily exact, but only serve to enable the parking assistance system to be set up. During and/or after the set-up of the parking assistance system, individual or all of the mentioned features can be adapted to the actual circumstances.

The core elements of the portable parking assistance system are formed by the number of sensors and the control device. The number of sensors includes a quantity N of sensors greater than or equal to one ($N \geq 1$). Different sensors of this number can be formed by different sensor types. When the parking assistance system has been set up, each of the sensors is designed to detect a particular detection range of the predetermined region. The particular detection range depends, on the one hand, on the arrangement and field of view of a respective sensor, on the other hand, the particular detection range for a given sensor can also be intentionally limited, for example, parts of a detection range that are completely or partially obscured by an object, such as a plant, can be hidden or ignored. It can also be helpful to limit the overlap of multiple detection ranges of multiple sensors in order to avoid over-determinacy.

Depending on the type of sensor, various objects located within the detection range can be detected. All sensors of the parking assistance system are designed to detect vehicles in the detection range. Advantageously, the sensors can be designed to detect objects such as people or larger animals. For safety reasons, it is advantageous if a lower threshold value for an object size is approximately 10-20 cm.

The particular detection range is determined in particular in a specified, uniform coordinate system of the parking assistance system when it is set up. The position of all spatially distributed elements of the parking assistance system, the respective positions of which are important for the operation of the parking assistance system, is known in the specified coordinate system. This means that the coordinates of the respective element already exist in the specified coordinate system, or else a unique coordinate transformation exists for transforming individual coordinates of a respective element into the specified coordinate system.

The specified coordinate system can be defined specifically for the parking assistance system, wherein, for example, a specific point of the predetermined range is defined as the zero point or origin of the coordinate system and a specific length is defined as the basic unit of measure. The specified coordinate system can also be a predetermined coordinate system, in particular of a global satellite-based navigation system, such as GPS.

The specified digital map comprises in particular an abstract representation of the positions relevant to the operation of the parking assistance system, for example, the positions of the sensors in the predetermined region and their respective detection ranges, the areas of the predetermined region that are provided as driving corridors or as parking spaces, and, if appropriate, further elements, such as natural obstacles or special features of the predetermined region, traffic control elements of the parking assistance system and other similar elements. The digital map can therefore be used as a basis in particular for route planning and controlling the vehicles. In the operation of the parking assistance system it may be provided that the digital map further comprises a representation of each vehicle or other mobile object that is present in the predetermined region. A collision calculation can then also be performed based on the digital map to avoid collisions.

In one embodiment, the operation of the parking assistance system in the assembled state is based, for example, on the positions of sensors and their detection ranges determined in the planning phase, as well as on the digital map of the predetermined region determined in the planning phase. When setting up the parking assistance system, care must be taken to ensure that the sensors are positioned and aligned with high accuracy in the manner planned during the planning phase. The path planning for individual vehicles in operation is based on the predetermined digital map. This has the advantage that the sensors for operation in the parking assistance system only need to be configured to transmit their respective sensor signal wirelessly. On the other hand, this embodiment is less flexible with regard to actual conditions at the particular location, which might not have been known in the planning phase, and in a possible extension of the parking assistance system with additional sensors at a later date.

For example, a short-range wireless network, such as a WLAN, is used to transmit the sensor signals wirelessly. A cellular network or other known wireless networking technology can also be used.

The control device is implemented at least partially in hardware. The control device may include specific hardware, such as an ASIC (Application Specific Implemented Circuit), or general use hardware, such as a microprocessor for executing a computer program. This means that the control device can also be partially implemented in software. In this case, the control device comprises a computer program product, a function, a routine, an algorithm, a program code and/or an executable object.

The control device is designed to receive the sensor signals from the sensors, to determine a respective position of the vehicles on the basis of the received sensor signals, and control each vehicle on the basis of the determined positions of the vehicles and a specified digital map of the predetermined region. It can also be said that the control device comprises a receiving unit for receiving the sensor signals of the sensors, a determination unit for determining the respective position of the vehicles on the basis of the received sensor signals, and a control unit for controlling the vehicles on the basis of the respective determined position and the specified digital map. Each of the units may be implemented in hardware and/or software. In the case of an implementation in hardware, the respective unit may be in the form of a computer or a microprocessor, for example. In the case of an implementation in software, the respective unit may be in the form of a computer program product, a function, a routine, an algorithm, part of a program code, or an executable object.

For example, controlling the vehicles involves determining a respective trajectory for a given vehicle. For example, the trajectory leads from a current position of the vehicle to a target position. The target position is in particular a specific parking space within the predetermined region, or a transfer area in which a user regains control of the vehicle from the parking assistance system. The trajectory is determined in particular on the basis of the specified digital map, which includes the designated driving corridors and parking spaces. On the basis of the determined trajectory, the vehicle is controlled in such a way that it travels along the determined trajectory. For this purpose, the parking assistance system transmits the appropriate control commands to the vehicle, for example. To transmit the control commands, a wireless communication technology is preferably used, such as a WLAN, a cellular connection or the like.

In embodiments, the portable parking assistance system comprises a transmitter which is designed to transmit control commands to the vehicles.

The portable parking assistance system is particularly suitable for use in an uncovered area, i.e. outdoors, or in halls with a very high roof. It is also advantageous if the predetermined region is substantially free of obstacles that can cause shadowing of the detection regions. In this case, comparatively few sensors are sufficient to detect large areas and thus make them usable by the parking assistance system.

According to one embodiment of the portable parking assistance system, the sensors each have a position sensor, which is designed to determine and output a position of the respective sensor when the parking assistance system is set up, wherein the control device is designed to receive the output position and to determine the particular detection range of the respective sensor in the specified digital map on the basis of the received position.

For example, the position sensor is a GPS sensor that detects and outputs the position of the respective sensor in a GPS coordinate system. Alternatively or in addition, it may be provided that the position sensors of different sensors determine their respective position relative to the other sensors. In this case, the position sensors are designed in particular to carry out a mutual triangulation and/or multilateration. A network of relative positions determined in this way can be oriented to a specific reference point, such as a specific sensor, on the specified digital map.

The output position includes, in particular, an orientation of the respective sensor. The orientation is determined, for example, by an azimuth angle and an elevation angle, which relate, for example, to a center of the detection range of the sensor (that is, the center point of the detection range is located in the specified direction starting from the sensor). The orientation is thus in a fixed, predetermined relation to the detection range of the respective sensor.

On the basis of the received position, the control device determines the respective specified detection range in the specified digital map. This fixes the detection range of the respective sensor in relation to the coordinate system of the digital map. Put another way, the detection range is calibrated.

This embodiment thus has the advantage that the sensors can be flexibly arranged when setting up the parking assistance system in order to meet the conditions of the particular location. Deviations from the arrangement of the planning phase are non-critical provided the part of the predetermined region in which the vehicles are controlled is fully captured by the sensors. In particular, there is no need for time-consuming manual measurement of the sensor positions and their respective alignment, as the sensors themselves determine and transmit their position.

According to a further embodiment of the portable parking assistance system, said system comprises a mobile position sensor which is designed to determine and output its position, wherein the control device is designed to receive the output position and to receive surface determination information assigned to one of the output positions, and further designed to determine the specified digital map of the predetermined region on the basis of the received position and the assigned surface determination information.

In this embodiment, the specified digital map can only be defined during or after the parking assistance system has been set up. In particular, this can eliminate the need for time-consuming, precise planning and installation of the parking assistance system. The parking assistance system can therefore be deployed very flexibly.

For example, all sensors of the parking assistance system are first set up and their detection ranges are determined as described above. If the specified digital map has not been determined at this point, the positions of the sensors and the detection ranges of the sensors, for example, form the basis for the determination of the digital map. The mobile position sensor is then passed through the predetermined region. In this process, for each position of the position sensor, surface determination information is determined and transmitted to the control device, which assigns the surface determination information to the respective position of the position sensor. In this way, the part of the predetermined area in which the vehicles are to be controlled is rasterized. The predetermined region is divided in this way into sub-areas, for example, which are each 20 cm×20 cm in size, each of these sub-areas being assigned the respective applicable surface determination information. The surface determination information comprises, for example, the indication that it is a corridor, possibly with a specific direction of travel, a footpath, an escape route, a parking space, possibly with an indication of a specific vehicle type and/or a prioritization, or the like.

This process is carried out in particular under the supervision of an operator who determines the respective surface determination information. For example, the operator walks or drives over the territory of the predetermined region, which is intended as a travel corridor, and determines the surface determination information accordingly.

According to a further embodiment of the portable parking assistance system, said system comprises a mobile position sensor, which is designed to determine and output its position independently of the parking assistance system, wherein the sensors are designed to detect the position sensor, and wherein the control device is designed to receive the position output from the position sensor, and further designed to compare the position received from the position sensor and the position of the position sensor determined on the basis of the sensor signals, in order to validate the specified digital map.

In this embodiment, it is advantageously a simple matter to check whether the positions of different elements in the specified digital map, in particular the positions of the sensors as well as the positions of the detection ranges or the boundaries of the detection regions, are correct. It can also be said that this process validates the specified digital map.

According to a further embodiment of the portable parking assistance system, this comprises a number of traffic control elements which can be arranged in the predetermined region, wherein each of the traffic control elements has a position sensor which is designed to determine and output a position of the respective traffic control element when the parking assistance system is set up, wherein the control device is configured to receive the output position and to determine the specified digital map on the basis of the received position of the respective traffic control element.

According to a further embodiment of the portable parking assistance system, the control device is designed to validate the control of the vehicles using a validation vehicle, wherein the validation vehicle is configured to be controlled by the parking assistance system and designed to determine its position independently of the parking assistance system, wherein the control device is designed to compare the position determined on the basis of the number of sensors and the position determined by the validation vehicle.

By means of the validation vehicle, for example, evidence can be provided that the control of the vehicles by the parking assistance system is carried out in compliance with regulations, in particular with regard to the precision of the control. If national or regional regulations stipulate that an acceptance test is necessary to grant an operating permit for the parking assistance system, this can therefore be simplified and automated.

According to a further embodiment of the portable parking assistance system, the number of sensors comprises a camera, a radar and/or a lidar.

In embodiments, cameras with an extended spectral range may be used, which comprises, for example, the visual spectral range and a near infrared range and/or UV range.

According to a further embodiment of the portable parking assistance system, said system comprises a number of holding means, wherein each holding means is designed to hold a respective sensor at a specific position in the predetermined region, wherein the sensors are designed to be releasably attached to the holding means.

The holding means include, for example, a tripod, a mast, a stand, a frame, a wire rope, a boom, a crane and the like. It may be provided that a holding device holds more than one sensor.

According to a further embodiment of the portable parking assistance system, the sensors each have a weatherproof housing, which provides protection for an electronics unit of the sensors against weather effects.

The housing can be made of plastic, metal, a composite material or the like. In particular, the housing is waterproof. Furthermore, the housing is preferably designed such that the sensor and its electronics remain sufficiently cooled in sunlight to provide continuous operation. For this purpose, the housing can provide cooling surfaces or heat sinks, for example. Furthermore, the housing may have an opening for an antenna, which can be connected to the sensor and via which the sensor transmits its sensor signal to the control device.

According to a further embodiment of the portable parking assistance system, the system comprises a number of mobile energy sources to supply the number of sensors with energy when the parking assistance system is set up.

For example, the mobile energy source is a battery.

In embodiments, a solar panel is provided, which charges the battery with electrical energy in sunlight in order to increase the range of the battery.

According to a second aspect, a method for operating a portable parking assistance system is proposed. The portable parking assistance system is suitable for being set up and dismantled at a plurality of different locations and is designed, when set up at a particular location, to control a number of vehicles within a predetermined region of the particular location. The method comprises the steps of:

a) arranging a number of sensors at respective particular positions in the predetermined region according to a specific arrangement, b) detecting vehicles located in a specific detection range of the predetermined region by means of the sensors and wirelessly transmitting a corresponding sensor signal, c) receiving the sensor signals from the sensors, d) determining a respective position of the vehicles on the basis of the sensor signals received, and e) controlling the vehicles on the basis of the respective position determined and a specified digital map of the predetermined region.

The embodiments and features described for the proposed portable parking assistance system apply mutatis mutandis to the proposed method. The method is preferably carried out with the portable parking assistance system according to the first aspect. The advantages and definitions for the portable parking assistance system as described in the first aspect apply mutatis mutandis to the proposed method.

A computer program product is also proposed, comprising instructions that, when the program is executed by a computer, cause said computer to carry out the steps b)-e) of the method described above.

A computer program product, such as a computer program means, may be provided or delivered, for example, as a storage medium such as a memory card, a USB stick, a CD-ROM, a DVD, or in the form of a downloadable file from a server in a network. This may take place for example in a wireless communication network by transmitting a corresponding file containing the computer program product or the computer program means.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred embodiments with reference to the accompanying figures.

Identical or functionally identical elements have been provided with the same reference signs in the figures, unless stated otherwise.

Figure 1A:
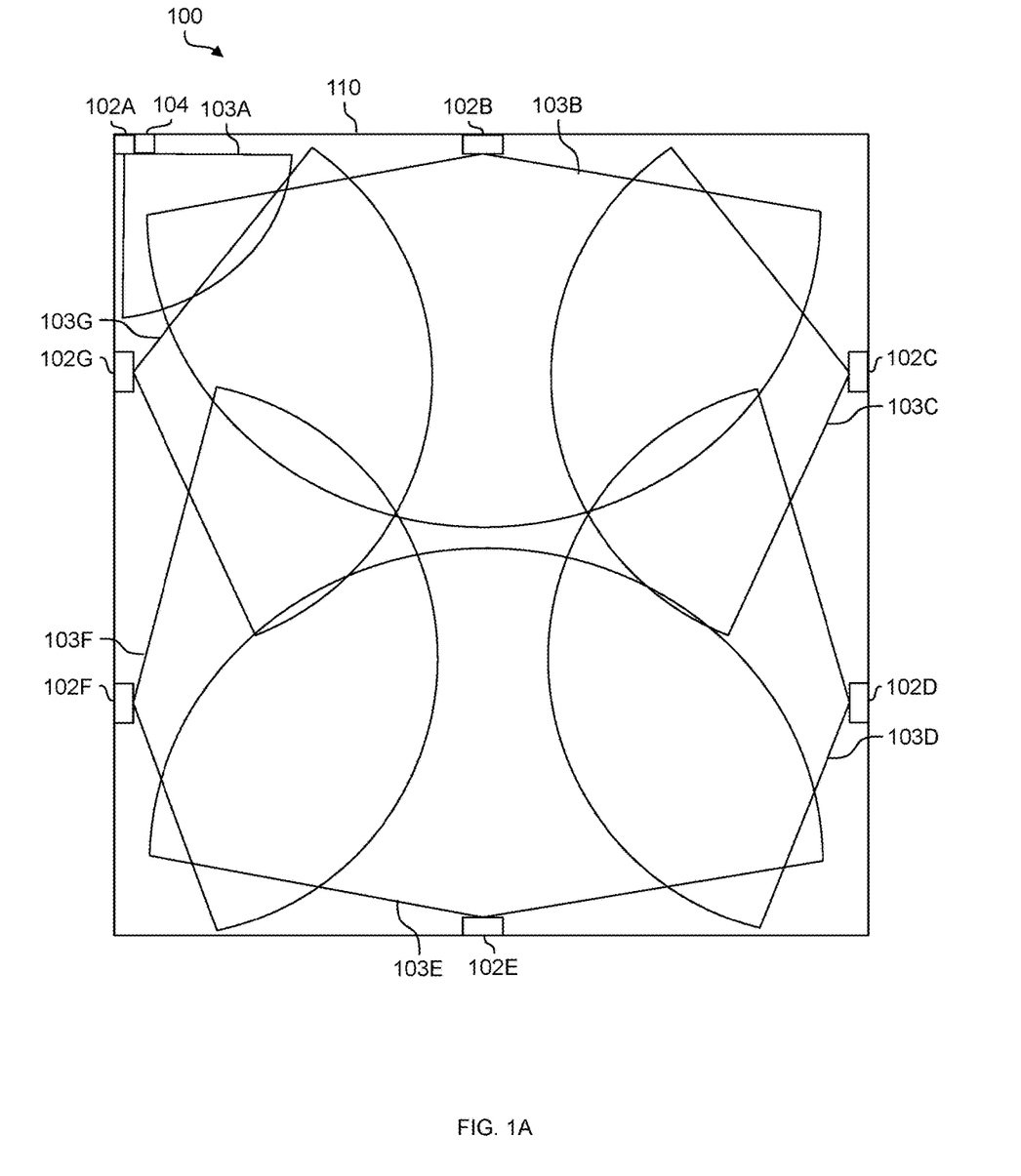
FIG. 1A shows a first schematic representation of an exemplary embodiment of a portable parking assistance system when set up.
Figure 1B:
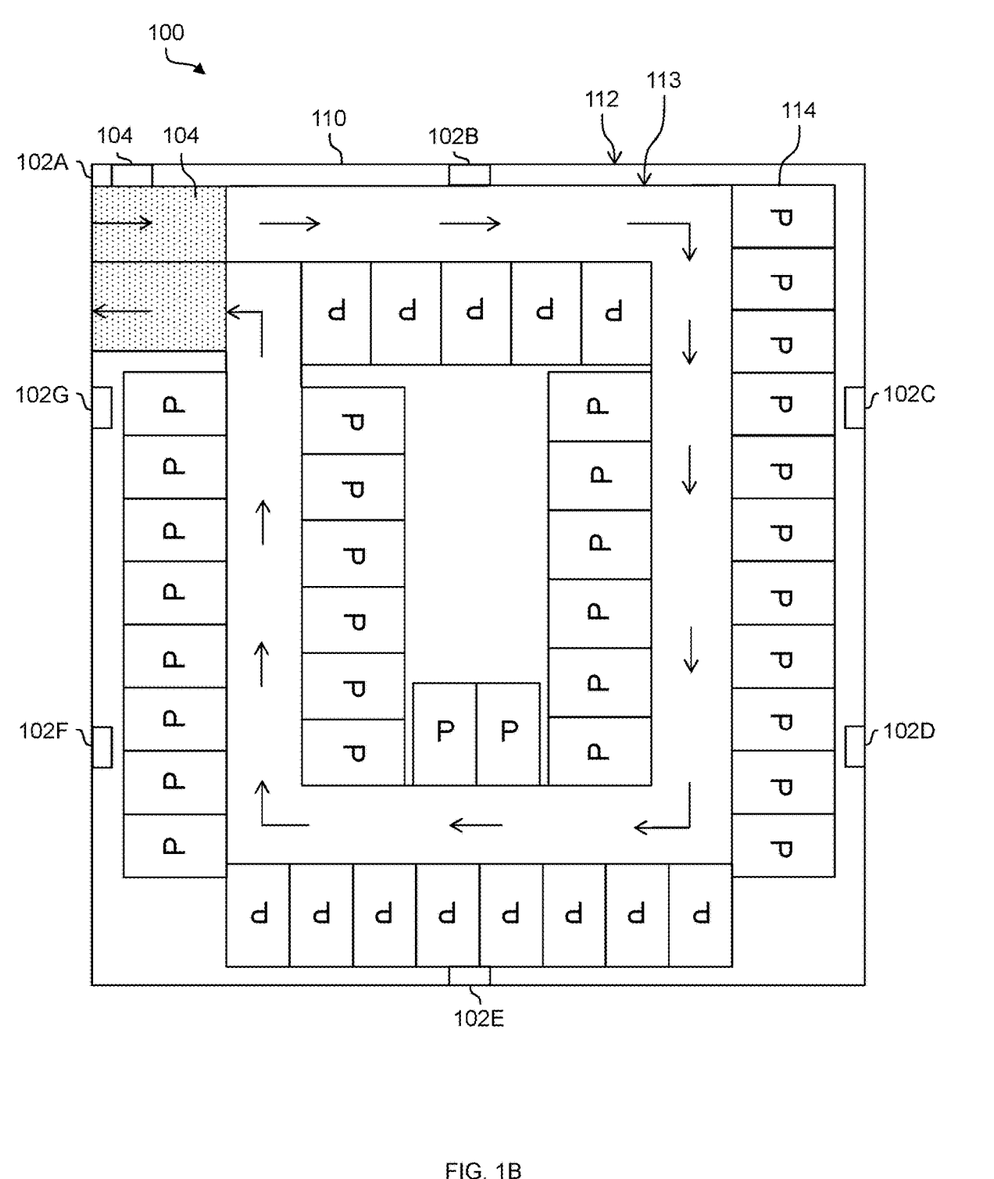
FIG. 1B shows a second schematic representation of the exemplary embodiment of a portable parking assistance system when set up.

FIGS. 1A and 1B each show a schematic representation of an exemplary embodiment of a portable parking assistance system 100 when set up. For reasons of clarity, the illustration is divided into two figures, each showing distinct aspects of the portable parking assistance system 100. In this example, the portable parking assistance system 100 comprises seven sensors 102A-102G and a control device 104. The sensors 102A-102G are attached, for example, to holding means 108 (see FIG. 3) and arranged at specific positions in a predetermined region 110. Each of the sensors 102A-102G has a specific detection range 103A-103G, as shown schematically in FIG. 1A. The sensors 102A-102G are each designed to detect vehicles 200 (see FIG. 2) that are located in their respective detection range 103A-103G, and to transmit a corresponding sensor signal SIG (see FIG. 2) to the control device 104. The control device 104 receives the sensor signals SIG of the sensors 102A-102G and on the basis of them determines the respective position of the vehicles 200.

The position of the vehicles 200 relates to a specified coordinate system, which assigns each point of the predetermined region 110 a position comprising at least two coordinates. In FIG. 1B, the predetermined region 110 is shown in the form of a specified digital map 112. The specified digital map 112 comprises, for example, an identification of the positions of the sensors 102A-102G and their detection ranges 103A-103G (not shown in FIG. 1B for reasons of clarity), and comprises in particular a division of the predetermined region 110 into a driving corridor 113, multiple parking spaces 114 (for reasons of clarity only one of the parking spaces is labeled with a reference sign), a transfer region 115 and unused regions (with no reference sign).

The driving corridor 113 in this example is a one-way street. In the transfer region 115, which is captured in particular by the sensor 102A, for example, the transfer of the respective vehicle 200 takes place from the user of the vehicle 200 to the parking assistance system 100 for automated entry into and exit from parking spaces. From here on, the parking assistance system 100 controls the vehicles 200 and guides them, for example, to a specific parking space 114. If the user wants to regain control of the vehicle 200, the parking assistance system 100 steers the respective vehicle 200 from the parking space 114 to the transfer region 115.

Figure 2:
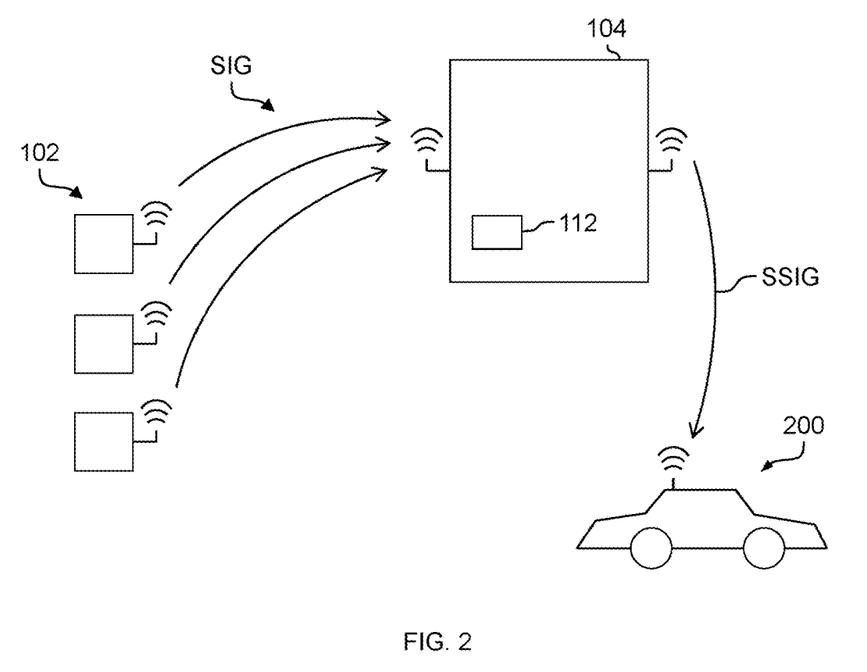
FIG. 2 schematically shows a transmission of sensor signals and control signals.

An example of the control of the vehicles 200 is illustrated with reference to FIG. 2. During the control of the vehicles 200, the control device 104 receives current sensor signals SIG continuously from the sensors 102, 102A-102G, on the basis of which it determines the position of the vehicles 200 in the specified digital map 112. Put another way, the control device 104 monitors the movement of the vehicles 200 by means of the sensors 102A-102G and in the manner of a control loop controls their movement using corresponding control signals SSIG. The vehicle 200 is an automobile or a truck, for example. The vehicle 200 preferably comprises, in particular, a receiver for receiving the control signal SSIG from the control device 104 of the parking assistance system 100, and a system which is designed to carry out the received control signals SSIG. Put another way, the vehicle 200 can be remotely controlled by the parking assistance system 100.

Figure 3:
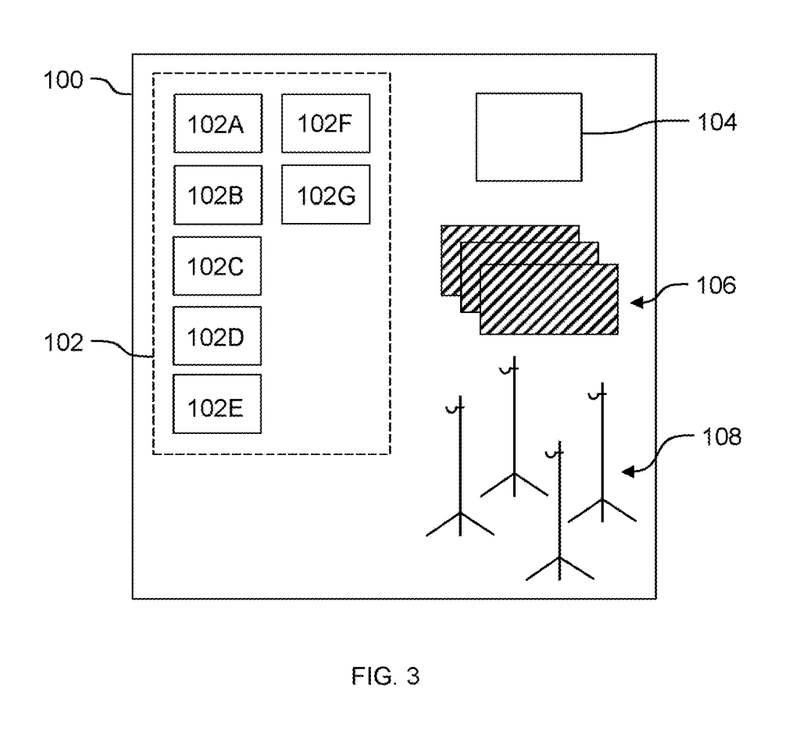
FIG. 3 shows a schematic representation of an exemplary embodiment of a portable parking assistance system when dismantled.

FIG. 3 shows a schematic representation of an exemplary embodiment of a portable parking assistance system 100 when dismantled. In this example, the parking assistance system 100 comprises a number 102 of sensors 102A-102G, the control device 104, a number of traffic control elements 106, which are each designed to determine their position and to transmit the determined position to the control device 104, and a number of holding means 108, which are designed to hold the sensors 102A-102G at certain positions in the predetermined region 110 when the parking assistance system 100 is set up. It should be noted that the traffic control elements 106 and the holding means 108 are optional and do not represent essential components of the portable parking assistance system 100. This parking assistance system 100 can be stored compactly and easily transported, for example with a truck or the like.

Figure 4:
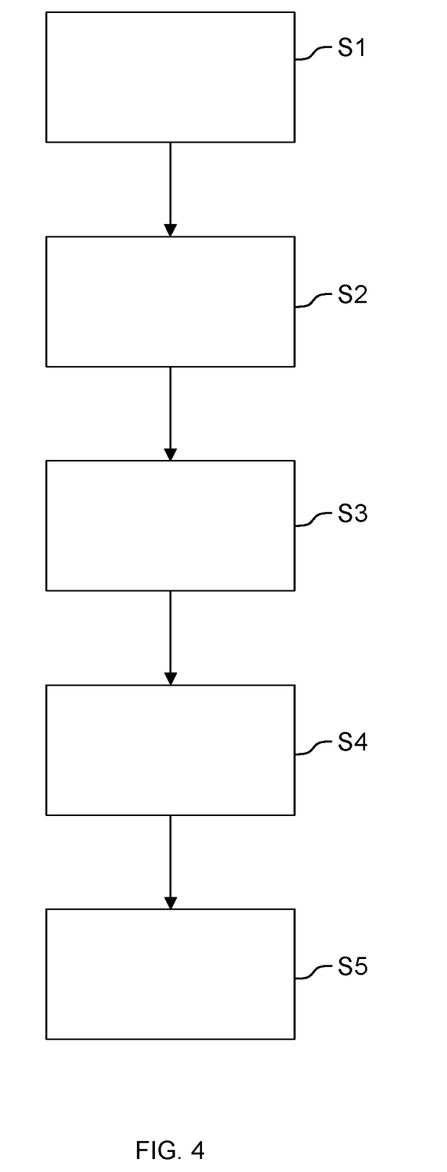
FIG. 4 shows a schematic block diagram of an exemplary embodiment of a method for operating a parking assistance system.

FIG. 4 shows a schematic block diagram of an exemplary embodiment of a method for operating a portable parking assistance system 100, for example the parking assistance system 100 of FIG. 1 or 3. The parking assistance system 100 is suitable for being set up and dismantled at a plurality of different locations and is designed, when set up at a particular location, to control a number of vehicles 200 (see FIG. 2) within a predetermined region 110 (see FIG. 1A, 1B) of the particular location. In a first step S1, a number 102 (see FIG. 2 or 3) of sensors 102A-102G (see FIG. 1A, 1B or 3) is arranged at respective specified positions in the predetermined region 110 according to a specified arrangement. In a second step S2, vehicles 200 which are located in a specific detection range 103A-103G (see FIG. 1A) of the predetermined region 110, are detected by means of the sensors 102A-102G, and a corresponding sensor signal SIG (see FIG. 2) is transmitted wirelessly. In a third step S3, the sensor signals SIG are received. In a fourth step S4, a respective position of the vehicles 200 is determined on the basis of the received sensor signals SIG. In a fifth step S5, the vehicles 200 are controlled on the basis of the respective determined position and a specified digital map 112 (see FIG. 1B or 2) of the predetermined region 110. This comprises, in particular, determining a trajectory for a respective vehicle, and transmitting a control signal SSIG (see FIG. 2) to the vehicle 200 to be controlled.

Although the present invention has been described on the basis of exemplary embodiments, it may be modified in many ways.

LIST OF REFERENCE SIGNS 100 portable parking assistance system
102 number of sensors
102A-102G sensors
103A-103G detection ranges
104 control device
106 traffic control elements
108 holding means
110 predetermined region
112 digital map
113 driving corridor
114 parking space
115 transfer region
200 vehicle
S1-S5 method step
SIG sensor signal
SSIG control signal

The invention claimed is:

1. A portable parking assistance system for being set up and dismantled at a plurality of different locations and which is configured, when set up at a particular location, to control one or more vehicles within a predetermined region of the particular location, the parking assistance system comprising:
one or more sensors which are arranged in the predetermined region,
wherein each of the sensors is designed to detect vehicles located in a respective specific detection range of the predetermined region and to wirelessly transmit a corresponding sensor signal; and
a control device configured to receive the sensor signals from the sensors, to determine a respective position of the vehicles on the basis of the received sensor signals, and control each vehicle on the basis of the determined positions of the vehicles and a specified digital map of the predetermined region.

2. The portable parking assistance system as claimed in claim 1,
wherein the sensors each comprise a position sensor,
wherein the position sensor is designed to determine and output a position of the respective sensor when the parking assistance system is set up, and
wherein the control device is designed to receive the output position and to determine the particular detection range of the respective sensor in the specified digital map on the basis of the received position.

3. The portable parking assistance system as claimed in claim 1,
wherein the system comprises a mobile position sensor which is designed to determine and output the position sensor's own position,
wherein the control device is designed to receive the output position and to receive surface determination information assigned to one of the output positions, and
wherein the control device is further designed to determine the specified digital map of the predetermined region on the basis of the received position and the assigned surface determination information.

4. The portable parking assistance system as claimed in claim 1,
wherein the system comprises one or more traffic control elements, which can be arranged in the predetermined region,
wherein each of the traffic control elements comprises a position sensor which is designed to determine and output a position of the respective traffic control element in the assembled state of the parking assistance system,
wherein the control device is designed to receive the output position and to determine the specified digital map of the predetermined region on the basis of the received position of the respective traffic control element.

5. The portable parking assistance system as claimed in claim 1,
wherein the system comprises a mobile position sensor, which is designed to determine and output the position sensor's own position independently of the parking assistance system,
wherein the sensors are designed to detect the position sensor, and
wherein the control device is designed to receive the position output from the position sensor, and
wherein the control device is further configured to compare the position received from the position sensor and the position of the position sensor determined on the basis of the sensor signals, in order to validate the specified digital map.

6. The portable parking assistance system as claimed in claim 1,
wherein the control device is designed to validate the control of the vehicles using a validation vehicle,
wherein the validation vehicle is designed to be controlled by the parking assistance system and designed to determine the validation vehicle's own position independently of the parking assistance system, wherein the control device is designed to compare the position determined on the basis of the one or more sensors and the position determined by the validation vehicle.

7. The portable parking assistance system as claimed in claim 1,
wherein the one or more sensors comprise at least one of a camera, a radar and/or a lidar.

8. The portable parking assistance system as claimed in claim 1,
wherein the system further comprises one or more holding means,
wherein each holding means is designed to hold a respective sensor at a specific position in the predetermined region,
wherein the sensors are designed to be releasably attached to the holding means.

9. The portable parking assistance system as claimed in claim 1,
wherein the sensors each comprise a weatherproof housing, which provides protection for an electronics unit of the sensors against weather effects.

10. The portable parking assistance system as claimed in claim 1,
further comprising one or more mobile energy sources, which are designed to supply the one or more sensors with energy in the assembled state of the parking assistance system.

11. A method for providing and operating a portable parking assistance system,
wherein the parking assistance system is for being set up and dismantled at a plurality of different locations and is configured, when set up at a particular location, to control one or more vehicles within a predetermined region of the particular location,
the method comprising:
arranging one or more sensors at respective particular positions in the predetermined region according to a particular arrangement;
detecting vehicles located in a specific detection range of the predetermined region by means of the sensors and wirelessly transmitting a corresponding sensor signal,
receiving the sensor signals,
determining a respective position of the vehicles on the basis of the sensor signals received, and
controlling the vehicles on the basis of the respective position determined and a specified digital map of the predetermined region.

12. A non-transitory computer readable medium containing program instructions for causing a processor to perform the method of claim 11.

* * * * *